United States Patent [19]
Sato

[11] Patent Number: 4,768,113
[45] Date of Patent: Aug. 30, 1988

[54] TAPE CASSETTE LOADING AND UNLOADING APPARATUS HAVING A LOCK MECHANISM FOR LOCKING A TAPE CASSETTE IN A LOADING POSITION

[75] Inventor: Manabu Sato, Yokohama, Japan

[73] Assignee: Victor Company of Japan, Ltd., Yokohama, Japan

[21] Appl. No.: 823,381

[22] Filed: Jan. 28, 1986

[30] Foreign Application Priority Data

Jan. 29, 1985 [JP] Japan .............................. 60-10704[U]

[51] Int. Cl.$^4$ .......................................... G11B 15/675
[52] U.S. Cl. ................................................. 360/96.5
[58] Field of Search ................................. 360/96.5, 84

[56] References Cited

U.S. PATENT DOCUMENTS 4,638,386  1/1987  Takamatsu ........................ 360/96.5
4,641,210  2/1987  Ohyama ........................... 360/96.5

Primary Examiner—Robert S. Tupper
Attorney, Agent, or Firm—Michael N. Meller

[57] ABSTRACT

A tape cassette loading and unloading apparatus comprises a holder which is inserted with a tape cassette, a belt-driven transmitting mechanism for moving the holder between a cassette receiving position and a predetermined loading position, and a lock mechanism for locking the transmitting mechanism when the holder reaches the predetermined loading position so that the holder is immovably locked in the predetermined loading position.

5 Claims, 7 Drawing Sheets

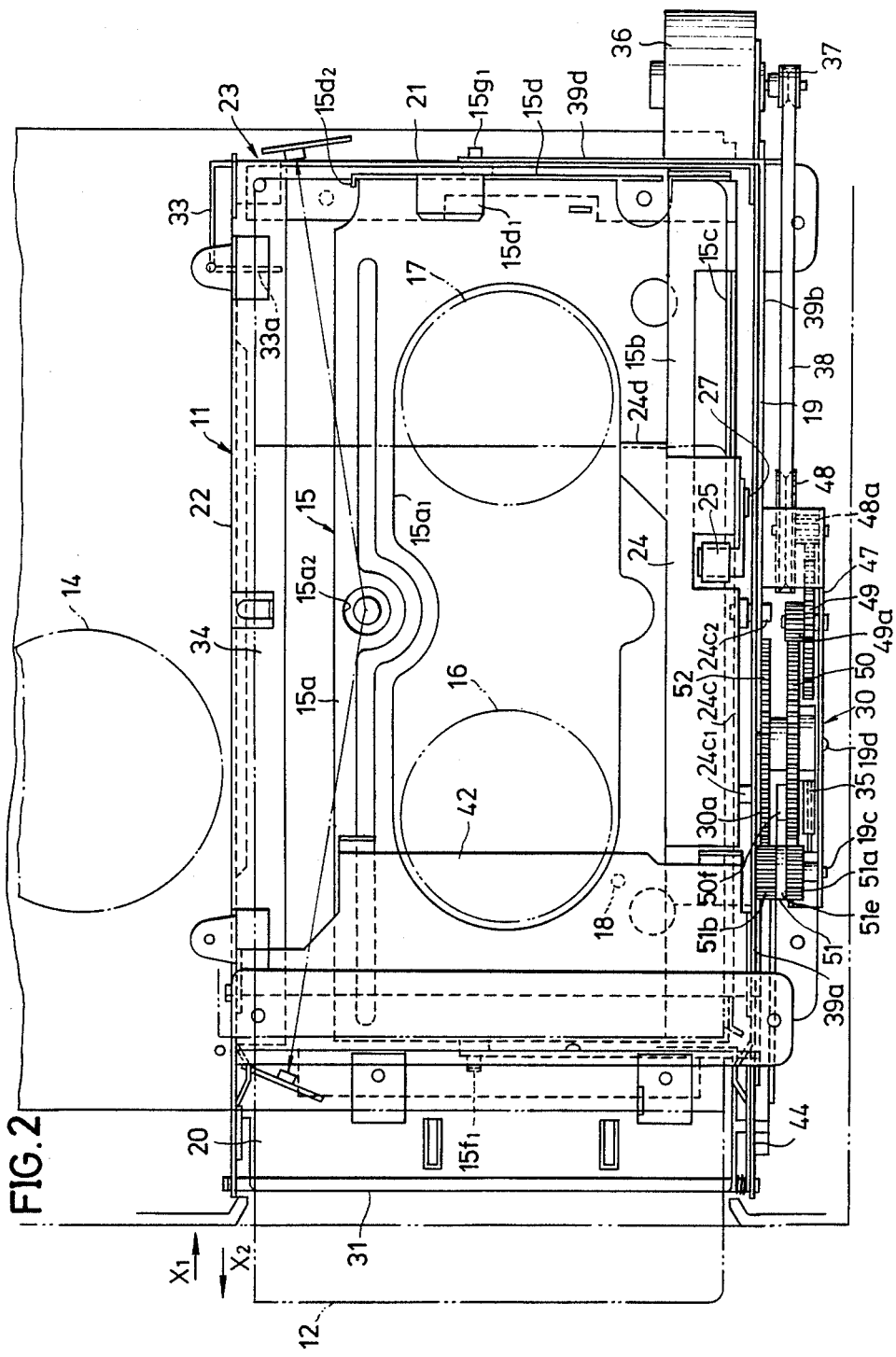

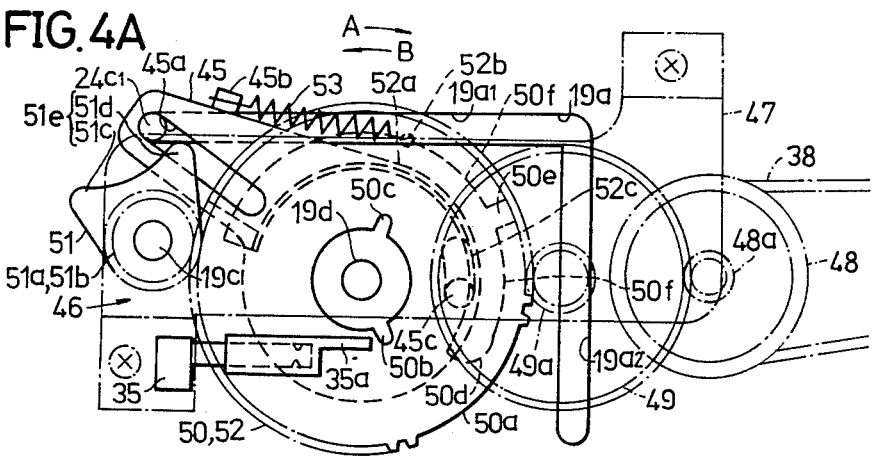
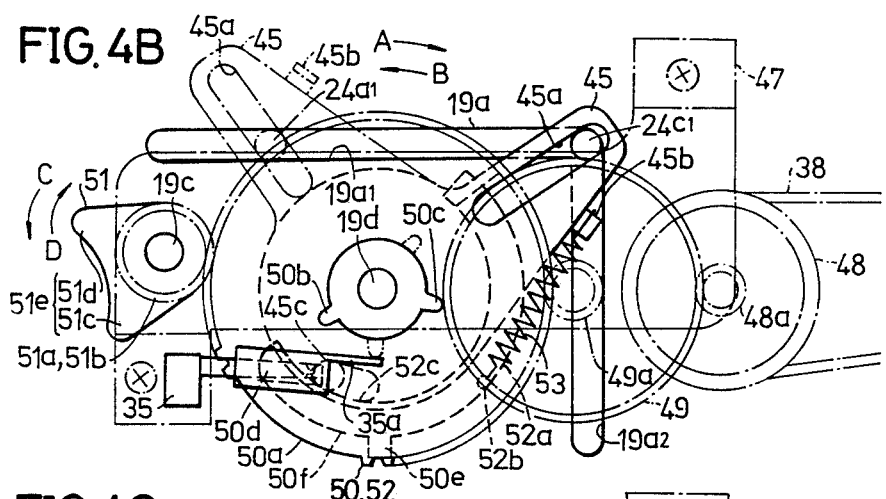
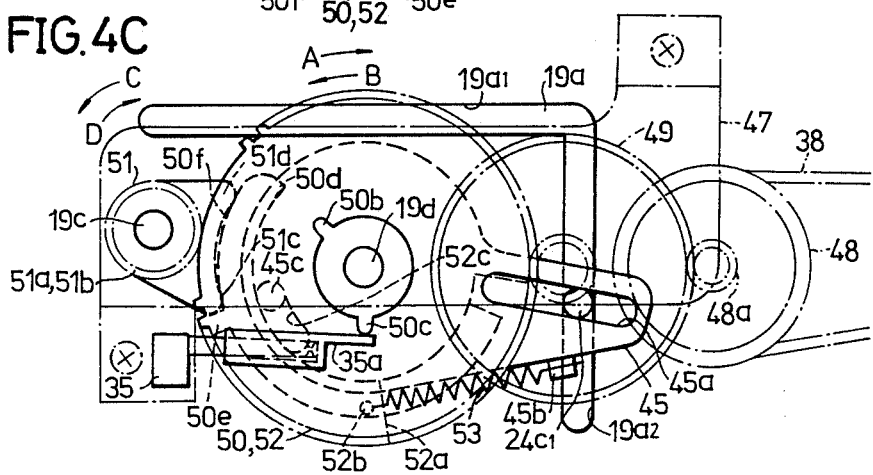

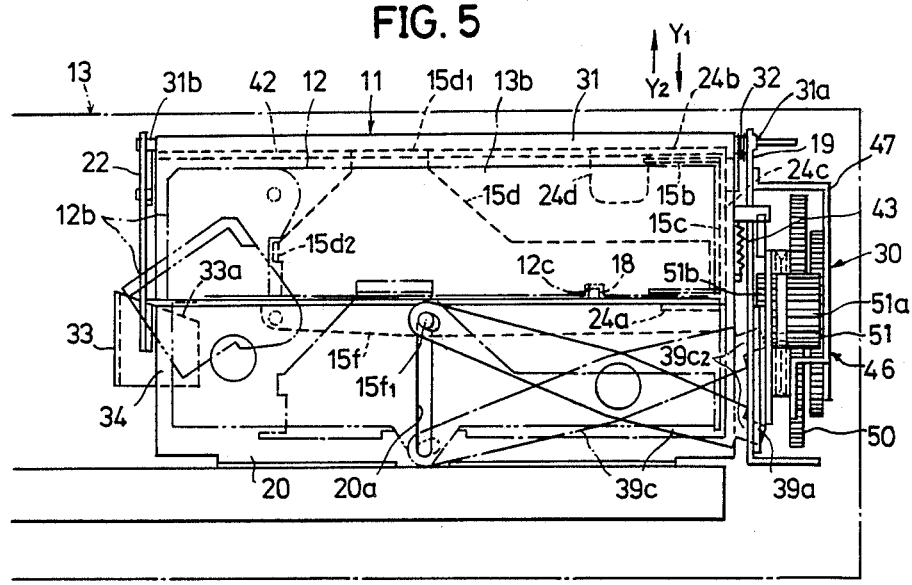
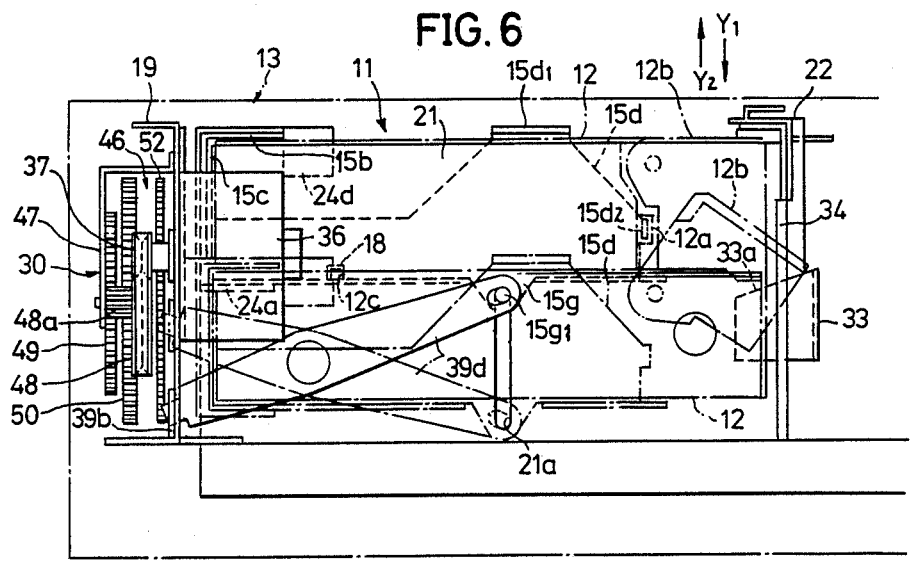

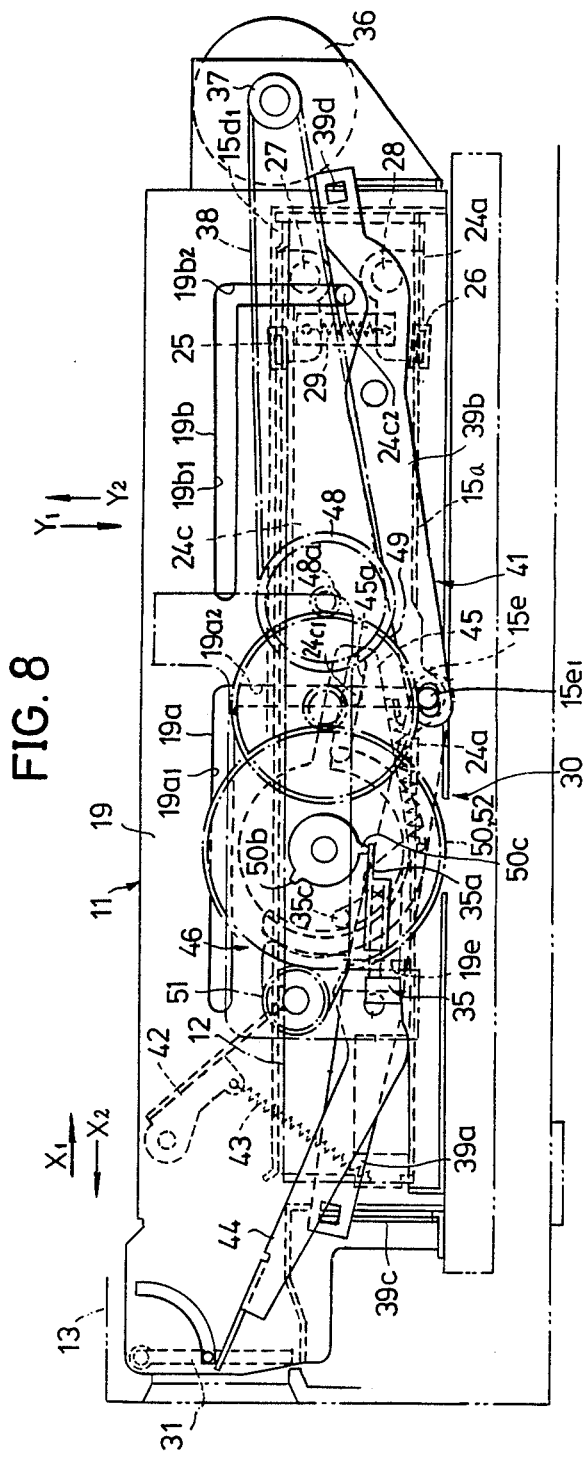

TAPE CASSETTE LOADING AND UNLOADING APPARATUS HAVING A LOCK MECHANISM FOR LOCKING A TAPE CASSETTE IN A LOADING POSITION

BACKGROUND OF THE INVENTION

The present invention generally relates to tape cassette loading and unloading apparatuses, and more particularly to a tape cassette loading and unloading apparatus provided in a magnetic recording and/or reproducing apparatus and having a holder which is inserted with a tape cassette, a belt-driven transmitting mechanism for moving the holder between a cassette receiving position and a predetermined loading position, and a lock mechanism for locking the transmitting mechanism when the holder reaches the predetermined loading position.

Conventionally, a tape cassette loading and unloading apparatus provided in a magnetic recording and/or reproducing apparatus comprises a holder for receiving a tape cassette which is inserted into the recording and/or reproducing apparatus. The holder is movable between a cassette receiving position where an inserted tape cassette is received and a predetermined loading position where a recording or a reproduction is carried out with respect to a magnetic tape accommodated within the tape cassette. The holder is moved by a rotational driving force of a drive motor transmitted by way of a worm gear coupled to a rotary shaft of the drive motor and a transmitting mechanism coupled to the worm gear and the holder. The worm gear comprises a worm and a worm wheel which meshes with the worm. When the drive motor is stopped at a time when the holder reaches the predetermined loading position during a loading mode or when the holder reaches the cassette receiving position during an unloading mode, a force acts on the holder so as to rotate the worm wheel or rotate toothed wheels of the transmitting mechanism. However, due to the meshing relationship between the worm and the worm wheel which meshes with the worm, the worm wheel does not rotate and the holder is locked in the predetermined loading position or the cassette receiving position. Accordingly, the worm gear also functions as a lock mechanism for locking the holder in the predetermined loading position or the cassette receiving position.

But when the holder is stopped, a load acts on the worm gear. The load acting on the worm wheel or the worm is large and may damage the worm gear. Hence, it is necessary to provide a resilient member in the transmitting mechanism and resiliently absorb the movement in the transmitting mechanism when the holder stops in the predetermined loading position or the cassette receiving position, in order to reduce the load acting on the worm gear when the holder stops. As a result, the construction of the tape cassette loading and unloading apparatus becomes complex.

Accordingly, in a conceivable tape cassette loading and unloading apparatus, it is possible to provide a pulley on the rotary shaft of the drive motor instead of providing the worm gear. In this case, the holder is moved by the rotational driving force of the drive motor which is transmitted by way of the pulley, a belt provided between the pulley and the transmitting mechanism, and the transmitting mechanism. When the holder stops in the predetermined loading position or the cassette receiving position, the belt slips and it is possible to prevent an excessively large load from being applied on the transmitting mechanism.

However, in the case of the holder which is moved by way of the belt-driven transmitting mechanism, the holder in the predetermined loading position may be moved by an external force which acts on the holder. That is, when an external vibration or shock is applied on the holder in the predetermined loading position, the toothed wheels of the transmitting mechanism may rotate and hence rotate the pulley and the drive motor by way of the belt. As a result, there is a problem in that the holder may move from the predetermined loading position and make it impossible to carry out the recording or reproduction on the recording and/or reproducing apparatus.

SUMMARY OF THE INVENTION

Accordingly, it is a general object of the present invention to provide a novel and useful tape cassette loading and unloading apparatus in which the problems described heretofore are eliminated.

Another and more specific object of the present invention is to provide a tape cassette loading and unloading apparatus comprising a holder which is inserted with a tape cassette, a belt-driven transmitting mechanism for moving the holder between a cassette receiving position and a predetermined loading position, and a lock mechanism for locking the transmitting mechanism when the holder reaches the predetermined loading position. According to the tape cassette loading and unloading apparatus of the present invention, it is possible to prevent an excessively large load from being applied to the transmitting mechanism when the holder stops in the predetermined loading position or the cassette receiving position. Further, it is possible to prevent the holder from moving from the predetermined loading position when the holder reaches the predetermined loading position so as to carry out a recording or a reproduction, even when an external force is applied on the holder.

Other objects and further features of the present invention will be apparent from the following detailed description when read in conjunction with the accompanying drawings.

BRIEF DESCRIPTION OF THE DRAWINGS

FIGS. 1 and 2 are a side view and a plan view respectively showing an embodiment of the tape cassette loading and unloading apparatus according to the present invention together with a part of a recording and/or reproducing apparatus;

FIG. 4A is a side view showing an essential part of an embodiment of a lock mechanism of the tape cassette loading and unloading apparatus according to the present invention;

FIG. 4B is a side view showing the lock mechanism in a state where the tape cassette is inserted into a holder of the tape cassette loading and unloading apparatus;

FIG. 4C is a side view showing the lock mechanism in a state where the holder is in a predetermined loading position and is locked by the lock mechanism;

FIGS. 5 and 6 are a front view and a rear view respectively showing the tape cassette loading and unloading apparatus;

FIG. 8 is a side view showing the tape cassette loading and unloading apparatus in a state where the holder is in the predetermined loading position.

DETAILED DESCRIPTION

Figure 1:
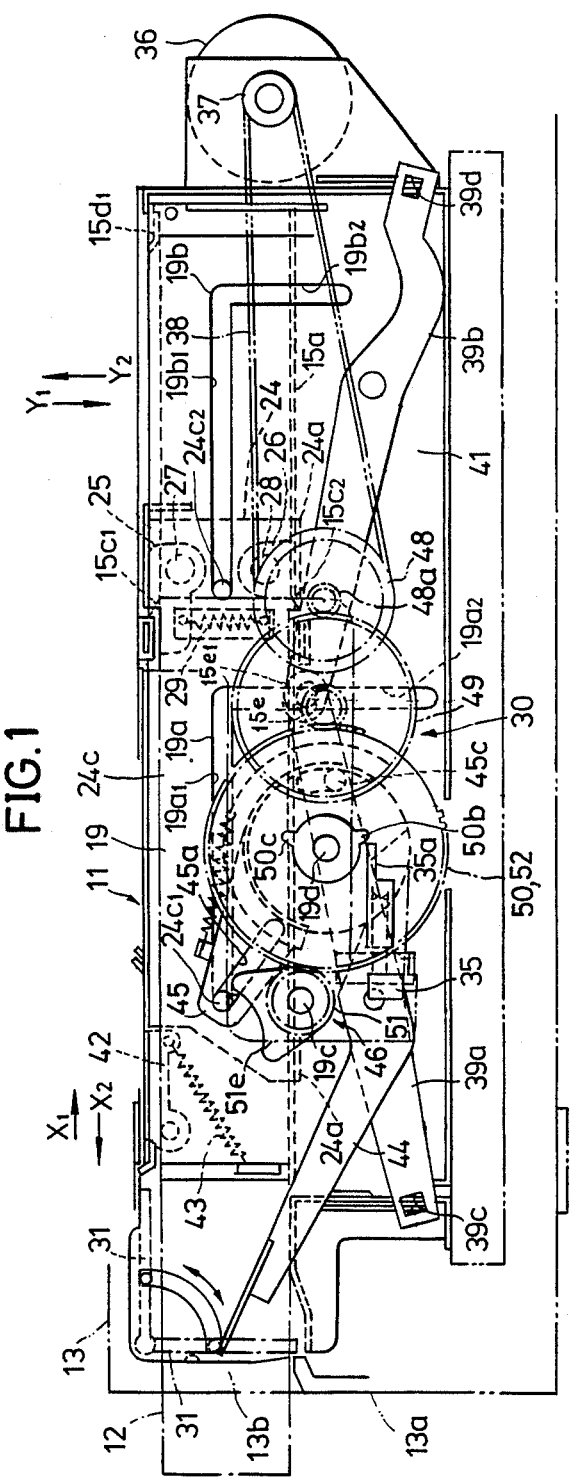
Figure 3A:
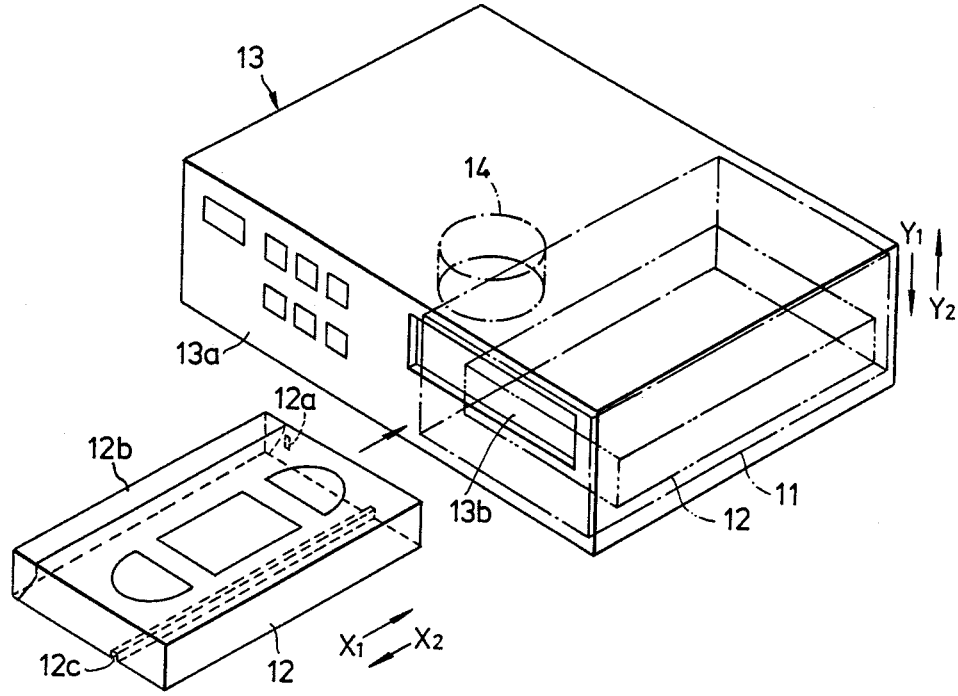
FIGS. 3A and 3B are a perspective view and a side view respectively showing the recording and/or reproducing apparatus together with a tape cassette for explaining an insertion of the tape cassette into the recording and/or reproducing apparatus.
Figure 3B:
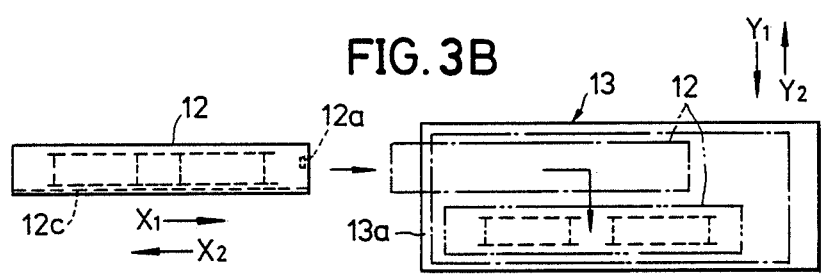

An embodiment of the tape cassette loading and unloading apparatus according to the present invention is shown in FIGS. 1 and 2. In FIGS. 1 and 2, a tape cassette loading and unloading apparatus 11 is mounted within a magnetic recording and/or reproducing apparatus (hereinafter simply referred to as a VTR) 13. A tape cassette 12 which is played on the VTR 13 has an approximately rectangular parallelepiped shape with top and bottom surfaces respectively having a longer side and a shorter side. As shown in FIGS. 3A and 3B, the tape cassette 12 comprises a lid lock release button 12a provided on one side surface thereof, a lid 12b provided on a front thereof along the longitudinal direction of the tape cassette 12, and a groove 12c formed on the bottom surface thereof along the longitudinal direction of the tape cassette 12. The groove 12c is provided at a position offset from the center of the shorter side of the tape cassette 12. The loading and unloading apparatus 11 is mounted within the VTR 13 facing such a direction that the loading and unloading apparatus 11 receives the tape cassette 2 which is inserted from the one side surface thereof having the shorter side. As shown in FIG. 3A, the loading and unloading apparatus 11 is arranged on the right of the VTR 13 so that a width of the loading and unloading apparatus 11 along a front face 13a of the VTR 13 is shorter than a depth of the loading and unloading apparatus 11 along a side surface of the VTR 13. Accordingly, an inserting opening 13b on the front face 13a of the VTR 13 for receiving the tape cassette 12 only needs to have a width which is slightly larger than the shorter side of the tape cassette 12.

A rotary drum 14 is provided on the left of the loading and unloading apparatus 11 in FIG. 3A. When the tape cassette 12 is in a predetermined loading position within the VTR 13 and the VTR 13 is put into a recording or reproducing mode, for example, a tape loading operation is performed to wrap a magnetic tape (not shown) accommodated within the tape cassette 12 around an outer peripheral surface of the rotary drum 14 over a predetermined angular range. When the tape cassette 12 is inserted into the VTR 13 through the inserting opening 13b from the one side surface thereof having the release button 12a so that the lid 12b is on the left, the tape cassette 12 is carried from a cassette receiving position indicated by a one-dot chain line in FIG. 3B to the predetermined loading position indicated by a two-dot chain line.

As shown in FIGS. 1, 2, 5, and 6, a holder 15 of the loading and unloading apparatus 11 for receiving the inserted tape cassette 12 is open on the left side thereof, that is, on the left side thereof facing the rotary drum 14 so that the tape loading operation can be performed without being interfered by the holder 15. The holder 15 comprises a bottom plate 15a on which the inserted tape cassette 12 rests, a top plate 15b which faces the top surface of the inserted ape cassette 12, and a side plate 15c connecting the top and bottom plates 15b and 15a. Hence, the holder 15 substantially has a sideways U-shape cross section when viewed in a tape cassette inserting direction X1.

The bottom plate 15a is provided with a generally oval opening 15a1 into which a supply reel base 16 and a take-up reel base 17 of the VTR 13 relatively enter, and a hole 15a2 into which a tape end detection lamp (not shown) of the VTR 13 enters. A projecting pin 18 is also provided on the top surface of the bottom plate 15a at a position deviated from an imaginary line which passes a center of the loading and unloading apparatus 11 and extends along the longitudinal direction of the loading and unloading apparatus 11. The projecting pin 18 engages with the groove 12c of the tape cassette 12 when the tape cassette 12 is inserted into the VTR 13. The projecting pin 18 prevents the tape cassette 12 from being inserted into the VTR 13 facing an incorrect direction, and also guides the inserted tape cassette 12.

A plate part 15d of the bottom plate 15 extends in a direction Y2. This plate part 15d has a bent portion 15d1 which extends in a direction X2 and opposes the top surface of the inserted tape cassette 12, and a bent contact portion 15d2 which also extends in the direction X2 for making contact with the release button 12a of the inserted tape cassette 12. In other words, the contact portion 15d2 is simply a bent integral portion of the plate part 15d of the holder 15 and projects in the direction X2 so as to oppose the release button 12a of the inserted tape cassette 12. The bottom plate 15a has three downwardly projecting portions 15e, 15f, and 15g which project in the direction Y1 from the bottom surface of the bottom plate 15a. The projecting portions 15e, 15f, and 15g respectively have pins 15e1, 15f1, and 15g1 which project outwardly of the holder 15.

Figure 7:
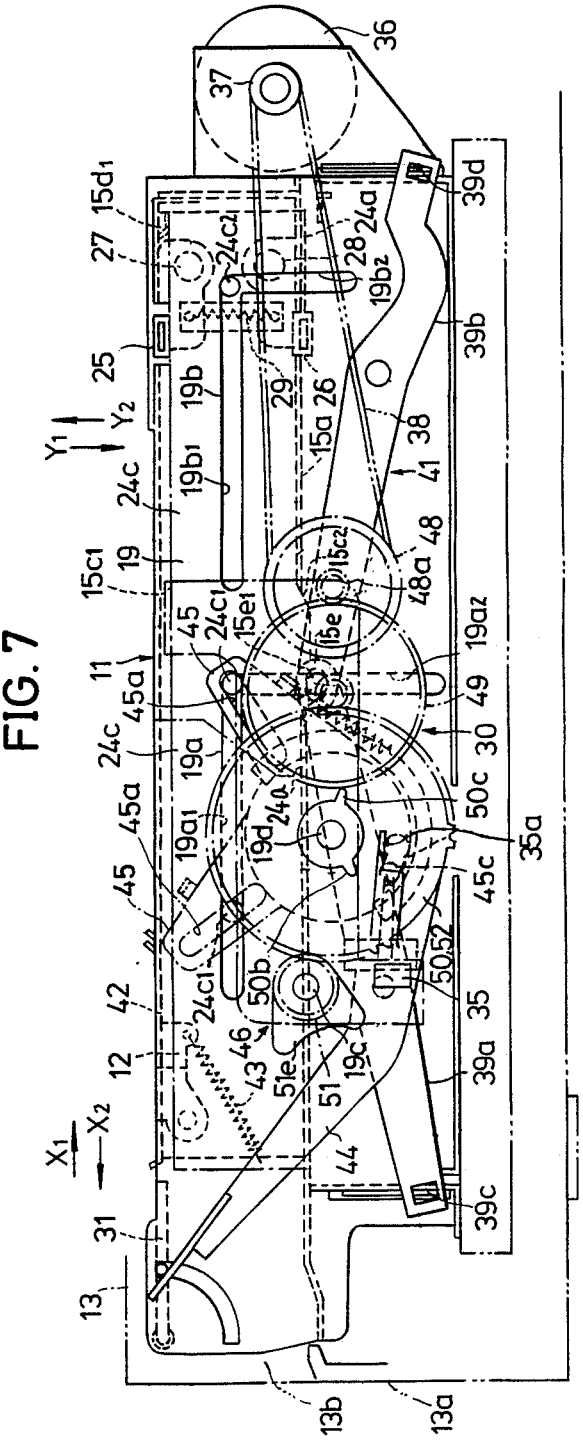
FIG. 7 is a side view showing the tape cassette loading and unloading apparatus in a state where the holder is in an insertion completion position.

As shown in FIG. 2, the holder 15 is supported within a rectangular frame 23 and is movable horizontally between a cassette receiving position shown in FIG. 1 where the tape cassette 12 is received and an insertion completion position shown in FIG. 7 and is movable vertically between the insertion completion position and the predetermined loading position shown in FIG. 8. When the tape cassette 12 is manually inserted in the cassette inserting direction X1 into the holder 15 in the cassette receiving position from one side surface of the tape cassette having the shorter side and pushes the holder 15 slightly past the cassette receiving position toward the insertion completion position, the holder 15 is automatically moved to the predetermined loading position via the insertion completion position as will be described later. The frame 23 is constituted by brackets 19 through 22 which are connected to each other. The bracket 19 has an L-shaped guide groove 19a for guiding the pin 15e1, the bracket 20 has a guide groove 20a for guiding the pin 15f1, and the bracket 21 has a guide groove 21a for guiding the pin 15g1. The holder 15 slides upwardly and downwardly (directions Y2 and Y1) in a state where the pins 15e1, 15f1, and 15g1 are respectively guided within the guide grooves 19a, 20a, and 21a.

A slide member 24 comprises a bottom part 24a which opposes the bottom surface of the bottom plate 15a of the holder 15, a top part 24b which opposes the upper surface of top plate 15b, and a side part 24c which opposes the outer surface of the side plate 15c as shown in FIG. 5. The slide member 24 substantially has a sideways U-shape cross section when viewed in the tape cassette inserting direction X1. The slide member 24 slides in the direction X1 and X2 along the outer side of the holder 15 when inserting and extracting the tape cassette 12.

As shown in FIG. 1, the side part 24c has on the rear part of the slide member 24 holding members 25 and 26 for respectively holding the top and bottom surfaces of the tape cassette 12 which is inserted into the holder 15 near the one side surface of the tape cassette 12. The slide member 24 has a contact part 24d which is an integral part of the upper part 24b and is formed by bending the upper part 24b downwardly in the direction Y1, and the contact part 24d makes contact with the one side surface of the inserted tape cassette 12. The holding members 25 and 26 are rotatably supported on pins 27 and 28, respectively. A coil spring 29 is stretched across the holding members 25 and 26, and the holding members 25 and 26 are urged to close upon each other by the pulling force of the coil spring 29. Before the tape cassette 12 is inserted into the VTR 13, the holding members 25 and 26 ride over respective sloping parts 15c1 and 15c2 provided on the top and bottom edges of the side plate 15c of the holder 15, and the holding members 25 and 26 are open against the force exerted by the coil spring 29 so as not to make contact with the top and bottom surfaces of the tape cassette 12.

The side part 24c has projecting pins 24c1 and 24c2 projecting outwardly of the slide member 24. The projecting pin 24c1 fits into the L-shaped guide groove 19a, and the projecting pin 24c2 fits into the guide groove 19b. As shown in FIG. 1, the projecting pin 24c1 also engages an elongated hole 45a in a rotary arm 45 of a drive transmitting mechanism 30.

When the rotary arm 45 rotates, the slide member 24 is guided by the guide grooves 19a and 19b and slides horizontally (directions X1 and X2) on the outside of the holder 15. The slide member 24 moves together with the holder 15 when the slide member 24 moves upwardly and downwardly (directions Y2 and Y1).

In the state where the the holder 15 is stationary in the cassette receiving position shown in FIG. 1, the projecting pins 24c1 and 24c2 of the slide member 24 are respectively located at ends of horizontal parts 19a1 and 19b1 of the guide grooves 19a and 19b. Hence, the holder 15 will not move even when an external force is applied on the holder 15 so as to move the holder 15 upwardly or downwardly.

FIG. 4A shows an essential part of a lock mechanism. As will be described later, a lock mechanism 46 locks the drive transmitting mechanism 30 when the holder 15 reaches the predetermined loading position.

The drive transmitting mechanism 30 comprises a pulley 48 rotatably provided on a crank shaped bracket 47 which is secured to the bracket 19 by screws, a reducing toothed wheel 49 which meshes with a small toothed wheel 48a on the pulley 48, and a partially toothed wheel 50 supported on a pin 19d on the bracket 19. The partially toothed wheel 50 has an untoothed part 50a and meshes with a small toothed wheel 49a of the reducing toothed wheel 49. The drive transmitting mechanism 30 further comprises a locking toothed wheel 51 supported on a pin 19c on the bracket 19 and having a first toothed wheel part 51a which meshes with the partially toothed wheel 50, a transmitting toothed wheel 52 which is supported on the pin 19d and meshes with a second toothed wheel part 51b of the locking toothed wheel 51, and the rotary arm 45 which is supported on the pin 19d and is provided between the bracket 19 and the transmitting toothed wheel 52.

The partially toothed wheel 50 has on the outer surface thereof projections 50b and 50c. When the tape cassette 12 is inserted into the holder 15 and the sliding member 24 is moved in the direction X1, the projection 50b activates a motor switch 35 and a drive motor 36 is started by use of an output of the motor switch 35. On the other hand, when the holder 15 reaches the predetermined loading position, the projection 50c activates the motor switch 35 and the drive motor 36 is stopped by use of the output of the motor switch 35. The output of the motor switch 35 is supplied to a control circuit (not shown) and the control circuit supplies a signal to the drive motor 36 for starting or stopping the drive motor 36 responsive to the output of the motor switch 35. The partially toothed wheel 50 has on the inner surface thereof an engaging part 50f which projects in an arcuate shape. This engaging part 50f comprises a semi-circular end portion 50d and a rectangular projecting portion 50e.

As shown in FIGS. 2 and 4A, the locking toothed wheel 51 has an engaging part 51e between the first toothed wheel 51a which meshes with the partially toothed wheel 50 and the second toothed wheel 51b which meshes with the transmitting toothed wheel 52. The engaging part 51e forks into two branches having projecting portions 51c and 51d.

The transmitting toothed wheel 52 has an untoothed part 52a, a hole 52b, and an arcuate elongated hole 52c. A coil spring 53 is stretched across a hook 45b on the rotary arm 45 and the hole 52b in the transmitting toothed wheel 52. A projecting pin 45c on the rotary arm 45 fits into the elongated hole 52c.

Due to the tension in the coil spring 53, the rotary arm 45 is urged to rotate in a direction A and the transmitting toothed wheel 52 is urged to rotate in a direction B. The rotary arm 45 and the transmitting toothed wheel 52 are mutually positioned by the engagement between the projecting pin 45c and the elongated hole 52c. Hence, the rotary arm 45 and the transmitting toothed wheel 52 rotate unitarily due to the engagement of the projecting pin 45c and the elongated hole 52c, but the rotary arm 45 and the transmitting toothed wheel 52 can rotate independently of each other against the force exerted by the coil spring 53 in a range in which the projecting pin 45c is movable within the elongated hole 52c.

The lock mechanism 46 is constituted by the partially toothed wheel 50 which is rotated by the drive motor 36, and the locking toothed wheel 51 which meshes with the partially toothed wheel 50 and transmits the driving force to the holder 15. As described before, the partially toothed wheel 50 has the engaging part 50f and the untoothed part 50a, and the locking toothed wheel 51 has the engaging part 51e.

As shown in FIG. 5, an opening and closing lid 31 is provided at the inserting opening 13b. Pins 31a and 31b on both sides of the lid 31 are respectively supported by the brackets 19 and 22. A torsion spring 32 is fitted over the pin 31a normally keeps the lid 31 in a closed state.

A lid opening member 33 is a bent part which is integrally formed on the bracket 21. When the holder 15 is lowered to the predetermined loading position and the inserted tape cassette 12 is accordingly lowered to the loading position within the VTR 13, the lid opening member 33 engages the lower edge of the lid 12b of the tape cassette 12 and opens the lid 12b. The bracket 22 is connected to the upper part of the front bracket 20 and the upper part of the rear bracket 21, has an opening 34 in a lower part thereof for permitting the tape loading operation to be performed.

Next, description will be given with respect to the operation of the lock mechanism 46 when the tape cassette 12 is inserted and loading into the VTR 13.

As shown in FIGS. 3A and 3B, the tape cassette 12 is inserted into the inserting opening 13b from the one side surface of the tape cassette 12 provided with the release button 12a, and is pushed in the cassette inserting direction X1. Hence, the lid 31 at the inserting opening 13b is pushed by the one side surface of the tape cassette 12 and is opened against the force exerted by the torsion spring 32, and the tape cassette 12 is inserted into the holder 15.

As shown in FIG. 2, the projecting pin 18 on the bottom plate 15a fits into the groove 12c of the bottom surface of the tape cassette 12 when the tape cassette 12 is inserted into the holder 15, and an erroneous insertion of the tape cassette 12 facing an incorrect direction is prevented.

The tape cassette 12 is permitted to be inserted into the holder 15 in the cassette receiving position only when the projecting pin 18 can fit into the groove 12c of the tape cassette 12. The projecting pin 18 positively prevents the tape cassette 12 from being inserted facing the incorrect direction because the projecting pin 18 will not coincide with the groove 12c when the tape cassette 12 is inserted facing the incorrect direction.

The tape cassette 12 is inserted in the direction X1 under the guidance of the projecting pin 18 and makes contact with the contact part 24d of the slide member 24.

When the other side surface of the tape cassette 12 is pushed to a position where this other side surface of the tape cassette 12 substantially coincides with the front face 3a of the VTR 13, the slide member 24 is pushed by the tape cassette 12 and is slid in the direction X1. As the slide member 24 slides in the direction X1, the holding members 25 and 26 pass the respective sloping parts 15c1 and 15c2 of the holder 15 and close upon each other by the action of the spring 29. Accordingly, the top and bottom surfaces of the tape cassette 12 are respectively held by the holding members 25 and 26.

Next, as shown in FIGS. 4B and 7, the pin 24c1 of the slide member 14 rotates the rotary arm 45 clockwise as the slide member 24 slides in the direction X1, and the projection 50b of the drive transmitting mechanism 30 makes contact with a contact piece 35a of the motor switch 35 so as to activate (for example, turn ON) the motor switch 35. In addition, when the slide member 24 slides in the direction X1 due to the insertion of the tape cassette 12, the rotary arm 45 of the drive transmitting mechanism 30 rotates in the direction A due to the engagement of the pin 24c1 and the elongated hole 45a. As a result, the rotary arm 45 rotates the transmitting toothed wheel 52, the locking toothed wheel 51, the partially toothed wheel 50, the reducing toothed wheel 49, the pulley 48, a belt 38, a pulley 37, and the drive motor 36.

The drive motor 36 mounted on the end part of the bracket 19 is started responsive to the turning ON of the motor switch 35, and the rotational driving force of the drive motor 36 is transmitted by way of the pulley 37 and the belt 38 to the pulley 48 of the drive transmitting mechanism 30.

The rotary arm 45 is rotated clockwise by the rotational driving force of the drive motor 36 which is transmitted by way of a reduction gear constituted by the toothed wheel and the like of the drive transmitting mechanism 30, and moves the slide member 24 to the insertion completion position shown in FIG. 7. The tape cassette 12 is moved in the direction X1 together with the slide member 24 in the state where the top and bottom surfaces of the tape cassette 12 are respectively held by the holding members 25 and 26.

When the tape cassette 12 is drawn into the holder 15 and reaches the insertion completion position, the release button 12a of the tape cassette 12 makes contact with the contact portion 15d2 and is pushed to a lock release position. Further, the top surface of the tape cassette 12 in the vicinity of the one side surface thereof opposes the bent portion 15d1. When the release button 12a is pushed by the contact portion 15d2, the locking of the lid 12b is released.

As the rotary arm 45 further rotates clockwise, the pins 24c1 and 24c2 of the slide member 24 respectively move along the horizontal parts 19a1 and 19b1 of the guide grooves 19a and 19b. As shown in FIG. 8, the tape cassette 12 within the holder 15 is lowered in the direction Y1 to the predetermined loading position together with the slide member 24 which moves along vertical parts 19a2 and 19b2 of the guide grooves 19a and 19b .

When the tape cassette 12 moves downwardly, the lower edge of the lid 12b makes contact with a sloping surface 33a of the lid opening member 33, and the lid 12b is relatively pushed upwardly and opened as shown in FIGS. 5 and 6. In addition, a synchronizing mechanism 41 of the loading and unloading apparatus 11 maintains the bottom plate 15a of the holder 15 in a horizontal state as the holder 15 is moved downwardly (and upwardly). The synchronizing mechanism 41 comprises arms 39a and 39b pivotally supported on the bracket 19, an arm 39c pivotally supported on the bracket 20, and an arm 39d pivotally supported on the bracket 21. The arms 39a and 39b respectively have one end thereof engaging with the pin 15e1 of the holder. The arm 39c has one thereof engaging with the pin 15f1 and another end thereof linked to another end of the arm 39a. The arm 39d has one end thereof engaging with the pin 15g1 and another end thereof linked to another end of the arm 39b. The synchronizing mechanism 41 links the pins 15e1, 15f1, and 15g1 so that the height position of the holder 15 is maintained constant at the pins 15e1, 15f1, and 15g1 when the holder 15 moves downwardly (and upwardly).

When the holder 15 reaches the predetermined loading position, the lid 12b is opened, the pin 24c2 makes contact with the lower end of the vertical part 19b2 of the guide groove 19b, and the holder 15 is stopped in the predetermined loading position. The rotational driving force is transmitted to the transmitting toothed wheel 52 even after the pin 24c2 hits the lower end of the vertical part 19b2. For this reason, the transmitting toothed wheel 52 rotates further in the direction A against the pulling force of the coil spring 53 with respect to the rotary arm 45 which is stationary together with the holder 15. Hence, due to the further rotation of the transmitting toothed wheel 52, the pushing force of the rotary arm 45 acting downwardly on the sliding member 24 becomes large, and the holder 15 is stably and positively positioned in the predetermined loading position.

The pulling force of the coil spring 53 pushes the holder 15 downwardly at the pin 15e1 by way of the rotary arm 45 and the slide member 24. Further, the pulling force of the coil spring 53 pushes the holder 15 downwardly at the pins 15e1, 15f1, and 15g1 by way of the arms 39a through 39d. This is the reason why the holder 15 is stably and positively positioned in the predetermined loading position.

The untoothed part 50a of the partially toothed wheel 50 opposes the first toothed wheel part 51a of the locking toothed wheel 51, and the locking toothed wheel 51 which rotates in a direction C and the transmitting toothed wheel 52 stop at positions shown in FIGS. 8 and 4C. The projecting portions 51c and 51d wait at a waiting position facing the center of the partially toothed wheel 50, and the engaging part 50f of the partially toothed wheel 50 which rotates in the direction A makes contact with the projecting portions 51c and 51d in the waiting position. In other words, the end portion 50d of the engaging part 50f of the partially toothed wheel 50 passes the projecting portion 51c of the locking toothed wheel 51 which is stationary, and the partially toothed wheel 50 stops when the projecting portion 50e hits the projecting portion 51d. The projection 50c hits the contact piece 35a of the motor switch 35 to activate (for example, turn ON) the motor switch 35 substantially at the same time as when the partially toothed wheel 50 stops. Thus, the motor switch 35 is turned ON and the drive motor 36 is stopped by use of the output of the motor switch 35.

The projecting portion 51d of the locking toothed wheel 51 makes contact with the end portion 51d of the engaging part 50f of the partially toothed wheel 50, and the locking toothed wheel 51 is prevented from rotating in a direction D. On the other hand, the projecting portion 51c makes contact with the projecting portion 50e of the engaging part, and the locking toothed wheel 51 is prevented from rotating in the direction C. That is, the locking toothed wheel 51 is locked in a non-rotatable state shown in FIGS. 4C and 8 by the engaging part 50f. Accordingly, even when an external force such as an external vibration or external shock is applied on the VTR 13 and the holder 15 receives a force which urges the holder 15 to move upwardly (or downwardly), the holder 15 is positively locked in the predetermined loading position by the locking performed by the locking toothed wheel 51 of the lock mechanism 46. Therefore, according to the loading and unloading apparatus 11, it is possible to prevent an excessively large load from being applied to the drive transmitting mechanism 30 when the holder 15 stops in the predetermined loading position or the cassette receiving position because the drive transmitting mechanism 30 is belt driven. Further, although the drive transmitting mechanism 30 is belt driven, it is possible to prevent the holder 15 from moving from the predetermined loading position when the holder 15 reaches the predetermined loading position so as to carry out a recording or a reproduction, even when an external force is applied on the holder 15.

A pushing member 42 is pivotally supported between the brackets 19 and 22. A coil spring 43 is stretched across the holder 15 and the pushing member 42, and the pushing member 42 is urged to rotate clockwise by the force exerted by the coil spring 43 when the holder 15 moves downwardly to the predetermined loading position. Thus, the pushing member 42 pushes against the top surface of the tape cassette 12 within the holder 15 in the predetermined locking position, and the tape cassette 12 is positioned in the loading position without play.

Next, when a tape cassette ejecting (unloading) operation is performed, the drive motor 36 rotates in a direction opposite to that at the time of the tape cassette inserting (loading) operation, and the drive transmitting mechanism 30 is driven so that the rotary arm 45 rotates counterclockwise (direction B) in FIG. 4C.

When the drive motor 36 rotates in the opposite direction, the partially toothed wheel 50 rotates in the direction B, and the engaging part 50f hits the projection 51c and 51d and rotates the locking toothed wheel 51 from the locking position so as to unlock the holder 15. Then, the partially toothed wheel 50 rotates and the untoothed part 50a separates from the position opposing the first toothed wheel part 51a of the locking toothed wheel 51. As a result, the partially toothed wheel 50 meshes with the first toothed wheel part 51a and rotates the rotary arm 45 in the direction B by way of the locking toothed wheel 51 and the transmitting toothed wheel 52. Due to the rotation of the rotary arm 45 in the direction B, the holder 15 moves upwardly in the direction Y2 along the guide grooves 19a and 19b and reaches the insertion completion position. The holder 15 further moves horizontally in the direction X2. When the holder 15 is returned to the cassette receiving position, the holding members 25 and 26 ride over the respective sloping parts 15c1 and 15c2 and separate from the top and bottom surfaces of the tape cassette 12 so as to release the holding of the tape cassette 12. The tape cassette 12 is ejected to such an eject position that the other side surface of the tape cassette 12 projects from the inserting opening 13b of the VTR 13.

The projection 50b of the partially toothed wheel 50 hits the contact piece 35a and turns the motor switch 35 ON when the tape cassette ejecting operation is performed. However, the control circuit described before is designed so as not to stop the drive motor 36 responsive to the output of the motor switch 35 in this case. As a result, the drive transmitting mechanism 30 is driven until the tape cassette 12 is ejected to the eject position.

When ejecting the tape cassette 12, the pin 45a of the rotary arm 45 hits and rotates a lid opening member 44 clockwise while the holder 15 moves from the predetermined loading position to the insertion completion position, so that the lid 31 is opened. Hence, when the tape cassette 12 is ejected through the inserting opening 13b, the lid 31 is open and will not interfere with the ejection of the tape cassette 12.

In the embodiment described heretofore, the loading and unloading apparatus 11 is applied to the VTR 13 having such a construction that the tape cassette 12 is inserted into the inserting opening 13b from the one side surface of the tape cassette 12. However, the loading and unloading apparatus of the present invention is not limited to the application to such a VTR, and may be applied to a VTR having such a construction that the tape cassette 12 is inserted from the front thereof having the lid 12b, for example.

Further, the present invention is not limited to these embodiments, but various variations and modifications may be made without departing from the scope of the present invention.

What is claimed is:

1. A tape cassette loading and unloading apparatus comprising:
 a frame;
 a holder provided within said frame for receiving and moving a tape cassette which is inserted into said holder;

guide means provided on said frame for guiding said holder so that said holder moves horizontally between a cassette receiving position where the tape cassette is received and an insertion completion position and moves vertically between said insertion completion position and a predetermined loading position;

a motor which rotates in a first direction during a tape cassette loading mode and rotates in a second direction during a tape cassette unloading mode, said second direction being opposite to said first direction; and transmitting means coupled to said motor for transmitting a rotational driving force of said motor to said holder so that said holder is moved to said predetermined loading position via said insertion completion position during the tape cassette loading mode and said holder is moved to said cassette receiving position via said insertion completion position during the tape cassette unloading mode, said transmitting means comprising a first rotary member rotatably supported on said frame and driven by said motor, a second rotary member rotatably supported on said frame and coupled to said first rotary member, and a third rotary member rotatably supported on said frame and coupled to said second rotary member and to said holder, said second rotary member transmitting the rotational driving force of said motor from said first rotary member to said third rotary member so that said third rotary member drives said holder, said first rotary member locking said second rotary member in a non-rotatable state when said holder reaches said predetermined loading position in the tape cassette loading mode, so that said holder is immovably locked in said predetermined loading position, said first rotary member comprising a first toothed wheel having a first engaging part and an untoothed part, said second rotary member comprising a second toothed wheel meshing with said first toothed wheel, a third toothed wheel, and a second engaging part, said third rotary member comprising a fourth toothed wheel meshing with said third toothed wheel, for transmitting the rotational driving force of said motor transmitted from said third toothed wheel to said holder, said fourth toothed wheel being coaxially provided with respect to said first toothed wheel, said untoothed part of said first wheel opposing said second toothed wheel immediately before said holder reaches said predetermined loading position, thereby stopping said second toothed wheel from rotating so that said first engaging part engages said second engaging part and locks said second rotary member in the non-rotatable state.

2. A tape cassette loading and unloading apparatus as claimed in claim 1 in which said second engaging part comprises a first projecting portion which makes contact with said first engaging part for preventing a rotation of said second rotary member in one direction and a second projecting portion which makes contact with said first engaging part for preventing a rotation of said second rotary member in a direction opposite to said one direction.

3. A tape cassette loading and unloading apparatus as claimed in claim 1 which further comprise a switch for starting and stopping said motor by an output thereof, said first rotary member having a first projection for activating said switch when the tape cassette is inserted into said holder in said cassette receiving position, so that said motor is started, and a second projection for activating said switch when said holder reaches said predetermined loading position or said cassette receiving position, so that said motor is stopped.

4. A tape cassette loading and unloading apparatus as claimed in claim 1 wherein said guide means comprises a guide groove formed in said frame, said holder having a pin guided along said groove, said third rotary member comprises a rotary arm for moving said holder by engaging with said pin.

5. A tape cassette loading and unloading apparatus as claimed in claim 1 in which said transmitting means comprises a belt coupled to said motor and a pulley rotatably supported on said frame and driven by said belt, said first rotary member being coupled to said pulley.

* * * * *